(12) United States Patent
Ryu et al.

(10) Patent No.: US 11,091,143 B2
(45) Date of Patent: Aug. 17, 2021

(54) APPARATUS AND METHOD FOR COMPENSATING FOR HEADING ANGLE

(71) Applicant: HYUNDAI MOBIS CO., LTD., Seoul (KR)

(72) Inventors: Kyung Jin Ryu, Yongin-si (KR); Nam Soo Kim, Yongin-si (KR); Jun hyeong Oh, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 126 days.

(21) Appl. No.: 16/503,151

(22) Filed: Jul. 3, 2019

(65) Prior Publication Data
US 2020/0010073 A1 Jan. 9, 2020

(30) Foreign Application Priority Data
Jul. 6, 2018 (KR) .................. 10-2018-0078679

(51) Int. Cl.
| | | |
|---|---|---|
| *G06K 9/00* | (2006.01) | |
| *B60W 20/12* | (2016.01) | |
| *B60W 30/12* | (2020.01) | |
| *B60W 40/06* | (2012.01) | |
| *B60W 40/103* | (2012.01) | |

(52) U.S. Cl.
CPC ............ *B60W 20/12* (2016.01); *B60W 30/12* (2013.01); *B60W 40/06* (2013.01); *B60W 40/103* (2013.01); *B60W 2420/42* (2013.01)

(58) Field of Classification Search
CPC ...... B60W 20/12; B60W 30/12; B60W 40/06; B60W 40/103; B60W 2420/42
USPC ....................................................... 382/104
See application file for complete search history.

(56) References Cited

U.S. PATENT DOCUMENTS

| | | | | |
|---|---|---|---|---|
| 9,552,523 | B2 * | 1/2017 | You .................... | B60W 30/12 |
| 9,889,848 | B2 * | 2/2018 | You .................... | B60W 30/12 |
| 10,569,771 | B2 * | 2/2020 | Song ................. | G06K 9/00798 |
| 10,663,967 | B2 * | 5/2020 | Yoo .................... | B60W 30/16 |
| 10,737,693 | B2 * | 8/2020 | Farooqi ............. | B60W 50/06 |
| 10,882,519 | B2 * | 1/2021 | Kim ................... | B60W 30/143 |
| 2018/0267172 | A1 * | 9/2018 | Oh ...................... | G01S 17/931 |

FOREIGN PATENT DOCUMENTS

KR    10-2018-0015018 A    2/2018

OTHER PUBLICATIONS

Lee, Dongwoo, et al. "Development of an integrated driving path estimation algorithm for ACC and AEBS using multi-sensor fusion." 2012 IEEE 75th Vehicular Technology Conference (VTC Spring). IEEE, 2012. (Year: 2012).*

(Continued)

*Primary Examiner* — Jonathan S Lee
(74) *Attorney, Agent, or Firm* — NSIP Law (57) ABSTRACT

Disclosed herein are an apparatus and method for compensating for a heading angle. The apparatus for compensating for a heading angle includes a compensation condition determination unit configured to determine whether a predetermined compensation condition is satisfied, to compensate for a heading angle of a camera, and a heading angle processing unit configured to compensate for the heading angle of the camera using a lane distance input from the camera, when it is determined by the compensation condition determination unit that the compensation condition is satisfied.

16 Claims, 7 Drawing Sheets

(56) References Cited

OTHER PUBLICATIONS

Wang, Yafei, et al. "Vision-based lateral state estimation for integrated control of automated vehicles considering multirate and unevenly delayed measurements." IEEE/ASME Transactions on Mechatronics 23.6 (2018): 2619-2627. (Year: 2018).*

Lattke, Benedikt, et al. "Road departure protection—a means for increasing driving safety beyond road limits." 24th International Technical Conference on the Enhanced Safety of Vehicles (ESV). vol. 1. 2015. (Year: 2015).*

Jo, Kichun, Keonyup Chu, and Myoungho Sunwoo. "GPS-bias correction for precise localization of autonomous vehicles." 2013 IEEE Intelligent Vehicles Symposium (IV). IEEE, 2013. (Year: 2013).*

\* cited by examiner

APPARATUS AND METHOD FOR COMPENSATING FOR HEADING ANGLE

CROSS-REFERENCE TO RELATED APPLICATION

The present application claims priority under 35 U.S.C. § 119(a) to Korean Patent Application No. 10-2018-0078679, filed on Jul. 6, 2018 in the Korean Intellectual Property Office, which is incorporated herein by reference in its entirety.

BACKGROUND

1. Technical Field

Embodiments of the present disclosure relate to an apparatus and method for compensating for a heading angle, and more particularly, to an apparatus and method for compensating for a heading angle, which assist lane keeping of a vehicle by compensating for a heading angle of a camera through a lane distance.

2. Related Art

With the development of driving assistance system (DAS) and the demand for autonomous driving in recent years, autonomous steering control or active steering control that automatically operates an electric steering system regardless of the intention of the driver has been developed, in addition to a basic function that assists the steering force of the driver.

Depending on such autonomous steering control or active steering control, there are a variety of steering-related control systems that affect an electric steering system for vehicles.

Examples of the steering-related control system for vehicles include a lane keeping assistance system (LKAS) that controls a vehicle to travel in a fixed lane after detecting the lane and controls lane keeping by operating a steering system, regardless of driver's operation, when there is concern about a lane departure.

The lane keeping assistance system detects a lane and detects the driving state of a vehicle to compensate for a heading angle or warn of a lane departure so that the vehicle is not out of the detected lane.

A conventional lane keeping assistance system recognizes lanes by analyzing images acquired through a camera. Especially, the control performance of the lane keeping assistance system for performing lateral control using the camera is significantly affected by the lane signal accuracy of the camera. The system is problematic in that it controls the vehicle to be one-sided from the center of the lane when an error occurs in the camera calibration that affects the accuracy.

The foregoing is disclosed in Korean Patent Application Publication No. 10-2018-0015018 (Feb. 12, 2018), entitled "Method of Estimating Lane Information".

SUMMARY

Various embodiments are directed to an apparatus and method for compensating for a heading angle, capable of assisting lane keeping of a vehicle by compensating for a heading angle of a camera through a lane distance.

In an embodiment, there is provided an apparatus for compensating for a heading angle, which includes a compensation condition determination unit configured to determine whether a predetermined compensation condition is satisfied, to compensate for a heading angle of a camera, and a heading angle processing unit configured to compensate for the heading angle of the camera using a lane distance input from the camera when it is determined by the compensation condition determination unit that the compensation condition is satisfied.

The compensation condition determination unit may determine whether a vehicle travels straight ahead.

The compensation condition determination unit may determine whether the vehicle travels straight ahead, using at least one of a vehicle yaw rate, a vehicle speed, a lane curvature, a camera viewing area, a camera reliability, a lane type, and a lane width variation.

The compensation condition determination unit may determine whether the vehicle travels straight ahead, using a steering angle of the vehicle.

The compensation condition determination unit may detect a trajectory of the vehicle using a GPS signal and map information and determine whether the vehicle travels straight ahead, using the detected trajectory.

The compensation condition determination unit may determine whether a lane is a straight lane.

The compensation condition determination unit may determine whether the lane is the straight lane, using a curvature of the lane and a heading angle of the camera.

The heading angle processing unit may include a heading angle offset processing unit configured to detect a heading angle offset using the heading angle of the camera and the lane distance therefrom, and a heading angle compensating unit configured to compensate for the heading angle of the camera by subtracting the heading angle offset, detected by the heading angle offset processing unit, from the heading angle of the camera.

The heading angle offset processing unit may include a reference heading angle calculator configured to calculate a reference heading angle from the heading angle of the camera using the lane distance, a difference value detector configured to detect difference values between the reference heading angle calculated by the reference heading angle calculator and the heading angle of the camera in chronological order, and a heading angle offset detector configured to detect the heading angle offset by averaging the difference values, detected by the difference value detector, for each time zone.

In an embodiment, there is provided an apparatus for compensating for a heading angle, which includes a heading angle offset processing unit configured to detect a heading angle offset using a heading angle of a camera and a lane distance therefrom, and a heading angle compensating unit configured to compensate for the heading angle of the camera using the heading angle of the camera and the heading angle offset detected by the heading angle offset processing unit.

The heading angle compensating unit may compensate for the heading angle of the camera by subtracting the heading angle offset, detected by the heading angle offset processing unit, from the heading angle of the camera.

The heading angle offset processing unit may include a reference heading angle calculator configured to calculate a reference heading angle using the lane distance, a difference value detector configured to detect difference values between the reference heading angle calculated by the reference heading angle calculator and the heading angle of the camera in chronological order, and a heading angle offset detector configured to detect the heading angle offset by averaging the difference values, detected by the difference value detector, for each time zone.

In an embodiment, there is provided a method of compensating for a heading angle, which includes determining whether a predetermined compensation condition is satisfied, to compensate for a heading angle of a camera, by a compensation condition determination unit, and compensating for the heading angle of the camera using a lane distance input from the camera, when it is determined by the compensation condition determination unit that the compensation condition is satisfied, by a heading angle processing unit.

In the determining whether a predetermined compensation condition is satisfied, the compensation condition determination unit may determine whether a vehicle travels straight ahead.

In the determining whether a predetermined compensation condition is satisfied, the compensation condition determination unit may determine whether the vehicle travels straight ahead, using at least one of a vehicle yaw rate, a vehicle speed, a lane curvature, a camera viewing area, a camera reliability, a lane type, and a lane width variation.

In the determining whether a predetermined compensation condition is satisfied, the compensation condition determination unit may determine whether the vehicle travels straight ahead, using a steering angle of the vehicle.

In the determining whether a predetermined compensation condition is satisfied, the compensation condition determination unit may detect a trajectory of the vehicle using a GPS signal and map information and determine whether the vehicle travels straight ahead, using the detected trajectory.

In the determining whether a predetermined compensation condition is satisfied, the compensation condition determination unit may determine whether a lane is a straight lane.

In the determining whether a predetermined compensation condition is satisfied, the compensation condition determination unit may determine whether the lane is the straight lane, using a curvature of the lane and a heading angle of the camera.

In the compensating for the heading angle of the camera, the heading angle processing unit may detect a heading angle offset using the heading angle of the camera and the lane distance therefrom and compensate for the heading angle of the camera by subtracting the detected heading angle offset from the heading angle of the camera.

In the compensating for the heading angle of the camera, the heading angle processing unit may calculate a reference heading angle from the heading angle of the camera using the lane distance, detect difference values between the calculated reference heading angle and the heading angle of the camera in chronological order, and then detect the heading angle offset by averaging the detected difference values for each time zone.

As apparent from the above description, the apparatus and method for compensating for a heading angle according to the exemplary embodiments of the present invention can improve the deviation of the vehicle in the lane keeping assistance system by compensating for the heading angle of the camera through the lane distance to assist the lane keeping of the vehicle.

In addition, the apparatus and method for compensating for a heading angle according to the exemplary embodiments of the present invention can assist the lane keeping of the vehicle without performing camera correction operations such as after service (AS) and AutoFix when the vehicle is leaned by the lane keeping assistance system.

DETAILED DESCRIPTION

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

Various advantages and features of the present invention and methods accomplishing thereof will become apparent from the following description of embodiments with reference to the accompanying drawings. However, the present invention is not be limited to the embodiments set forth herein but may be implemented in many different forms. The present embodiments may be provided so that the disclosure of the present invention will be complete, and will fully convey the scope of the invention to those skilled in the art and therefore the present invention will be defined within the scope of claims. Like reference numerals throughout the description denote like elements.

Unless defined otherwise, it is to be understood that all the terms (including technical and scientific terms) used in the specification has the same meaning as those that are understood by those who skilled in the art. Further, the terms defined by the dictionary generally used should not be ideally or excessively formally defined unless clearly defined specifically. It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As is traditional in the corresponding field, some exemplary embodiments may be illustrated in the drawings in terms of functional blocks, units, and/or modules. Those of ordinary skill in the art will appreciate that these block, units, and/or modules are physically implemented by electronic (or optical) circuits such as logic circuits, discrete components, processors, hard-wired circuits, memory elements, wiring connections, and the like. When the blocks, units, and/or modules are implemented by processors or similar hardware, they may be programmed and controlled using software (e.g., code) to perform various functions discussed herein. Alternatively, each block, unit, and/or module may be implemented by dedicated hardware or as a combination of dedicated hardware to perform some functions and a processor (e.g., one or more programmed processors and associated circuitry) to perform other functions. Each block, unit, and/or module of some exemplary embodiments may be physically separated into two or more interacting and discrete blocks, units, and/or modules without departing from the scope of the inventive concept. Further, blocks, units, and/or module of some exemplary embodiments may be physically combined into more complex blocks, units, and/or modules without departing from the scope of the inventive concept.

Hereinafter, an apparatus and method for compensating for a heading angle according to exemplary embodiments of the present invention will be described below in detail with reference to the accompanying drawings through various examples of embodiments. It should be noted that the drawings are not necessarily to scale and may be exaggerated in thickness of lines or sizes of components for clarity and convenience of description. Furthermore, the terms as used herein are terms defined in consideration of functions of the invention and may change depending on the intention or practice of a user or an operator. Therefore, these terms should be defined based on the overall disclosures set forth herein.

Figure 1:
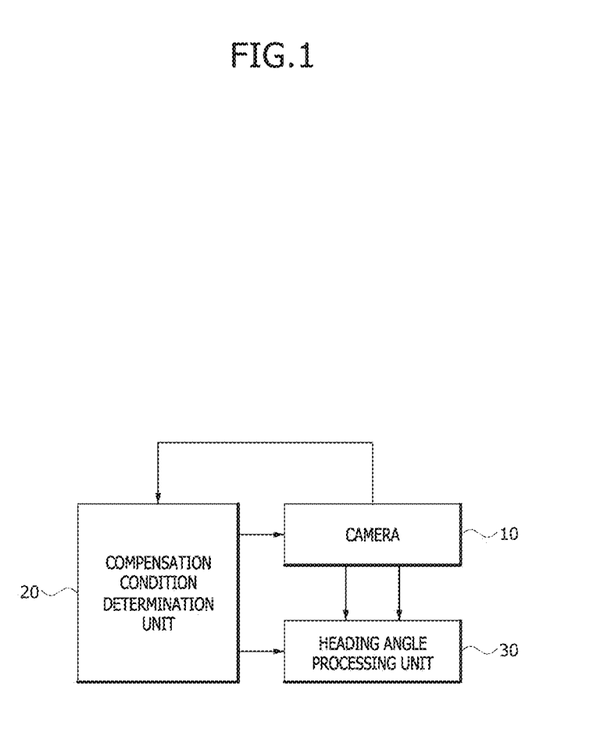
FIG. 1 is a block diagram illustrating an apparatus for compensating for a heading angle according to an embodiment of the present invention.
Figure 2:
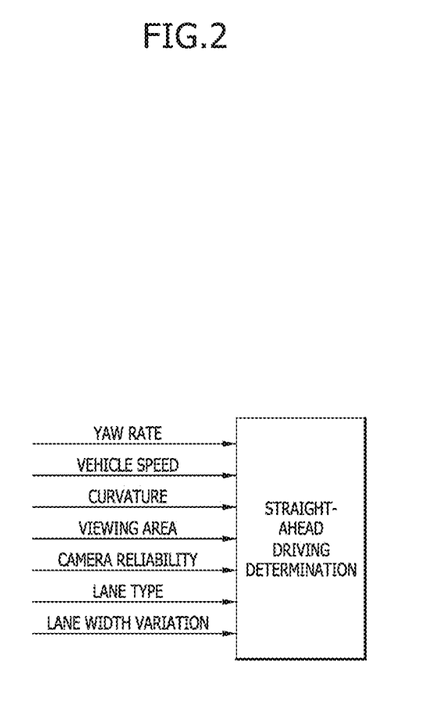
FIG. 2 is a conceptual view illustrating an example of straight-ahead driving determination according to an embodiment of the present invention.
Figure 3:
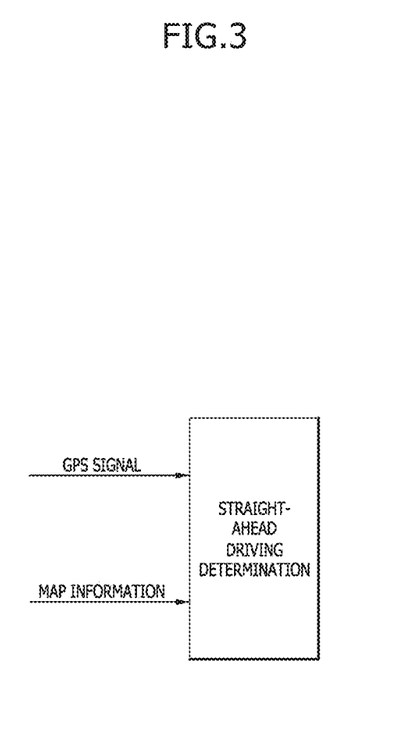
FIG. 3 is a conceptual view illustrating another example of straight-ahead driving determination according to an embodiment of the present invention.
Figure 4:
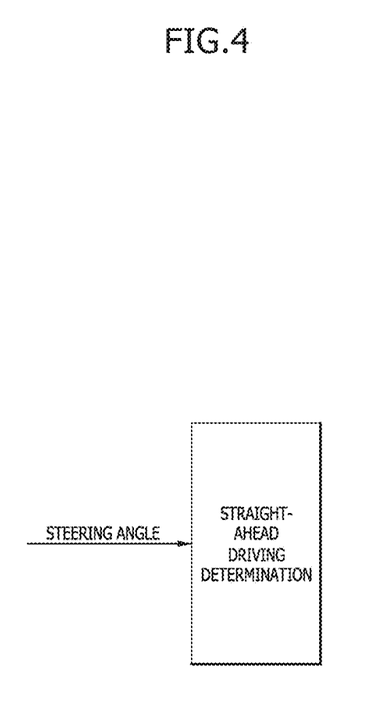
FIG. 4 is a conceptual view illustrating a further example of straight-ahead driving determination according to an embodiment of the present invention.
Figure 5:
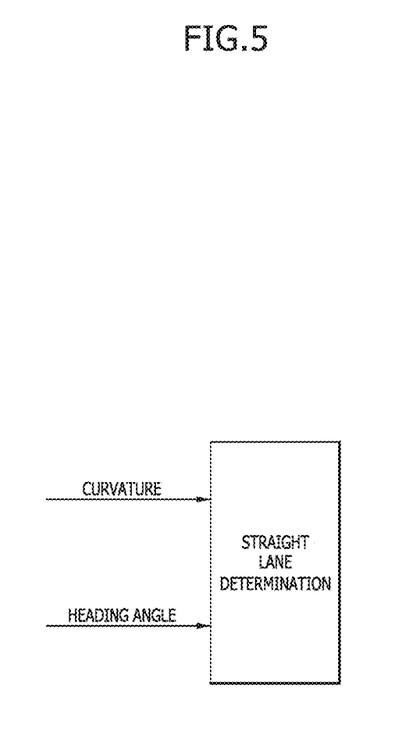
FIG. 5 is a conceptual view illustrating an example of straight lane determination according to an embodiment of the present invention.
Figure 6:
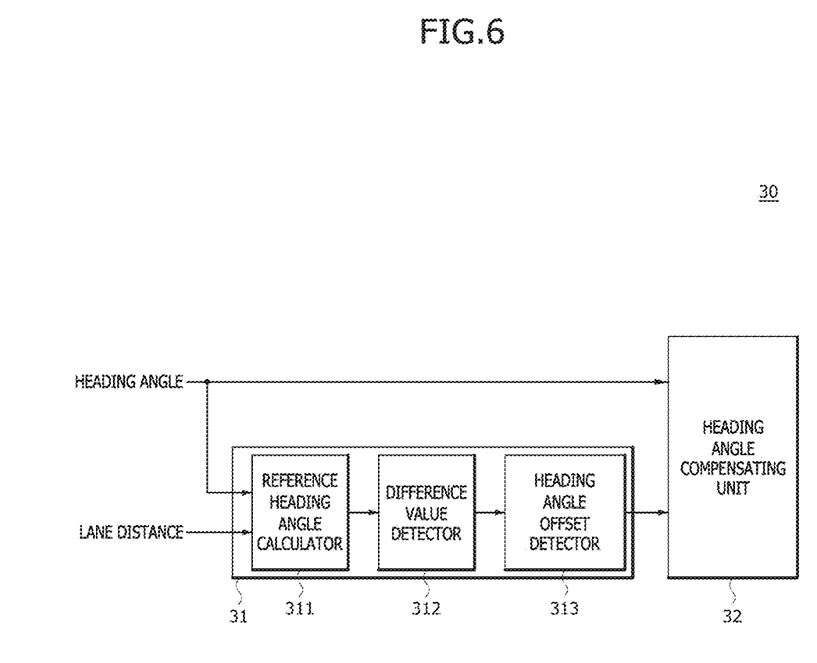
FIG. 6 is a block diagram illustrating a heading angle processing unit according to an embodiment of the present invention.

FIG. 1 is a block diagram illustrating an apparatus for compensating for a heading angle according to an embodiment of the present invention. FIG. 2 is a conceptual view illustrating an example of straight-ahead driving determination according to an embodiment of the present invention. FIG. 3 is a conceptual view illustrating another example of straight-ahead driving determination according to an embodiment of the present invention. FIG. 4 is a conceptual view illustrating a further example of straight-ahead driving determination according to an embodiment of the present invention. FIG. 5 is a conceptual view illustrating an example of straight lane determination according to an embodiment of the present invention. FIG. 6 is a block diagram illustrating a heading angle processing unit according to an embodiment of the present invention.

Referring to FIG. 1, the apparatus for compensating for a heading angle according to the embodiment of the present invention includes a camera 10, a compensation condition determination unit 20, and a heading angle processing unit 30.

The camera 10 captures the front of a vehicle to generate a forward image, and acquires camera information for compensating for a heading angle of the camera 10 from the generated forward image. Here, a multi-function camera (MFC) may be adopted as the camera 10 for acquiring the forward image and the camera information.

The camera information acquired by the camera 10 may include a heading angle of the camera, a lane curvature, a reliability of the camera 10, a viewing area, a lane type, and a lane width variation.

The heading angle refers to an angle between a vehicle traveling direction and a lane progress direction from the offset of a vanishing point and an image center point. The heading angle may be detected by comparing the position of the vanishing point with the position of the image center point. That is, the heading angle of the vehicle is zero (0) when the vanishing point of both lanes on the driving road coincides with the center point of the image captured by the camera.

The lane curvature is forward curvature information obtained using the information of both lanes on the road ahead.

The viewing area is a forward distance obtained from the image through the camera 10.

The camera reliability is reliability information about the curvature input from the camera 10. For example, the camera reliability may be expressed as high, medium, and low, or a numerical value, in which case the camera reliability may be used to compensate for the heading angle when it is high or medium, or is a numerical value of 2.

The lane type is information on whether the lane is a double lane, a dotted lane, a solid lane, or the like. In this case, although not the lane, information about the end or guard rail of the road or the unknown may be included in the lane. The information about the end or guard rail of the road or the unknown may be used as one of the lane types.

The lane width is a distance between left and right lanes. For example, when the distance from the camera to the left lane is 2 m and the distance from the camera to the right lane is 2.5 m, the lane width is 4.5 m. The lane width variation is a variation in the lane width.

The compensation condition determination unit 20 determines whether a predetermined compensation condition is satisfied, to compensate for the heading angle of the camera 10.

In other words, the compensation condition determination unit 20 collects information for compensating for the heading angle, and uses the collected information to determine whether the vehicle travels straight ahead or whether the lane is a straight lane under the compensation condition. In this case, the compensation condition determination unit 20 determines that the compensation condition is satisfied when the vehicle travels straight ahead or the lane is the straight lane.

Referring to FIG. 2, the compensation condition determination unit 20 determines whether the vehicle travels straight ahead, using a yaw rate, a vehicle speed, a curvature, a viewing area, a camera reliability, a lane type, and a lane width variation.

The yaw rate is a variation in the rate of the yaw angle which is an angle of rotation around a vertical line through the center of the vehicle, and the vehicle speed is a speed of the vehicle.

Since the yaw rate and the vehicle speed are able to be easily embodied by those skilled in the art, a detailed description thereof will be omitted herein.

The compensation condition determination unit 20 determines that the vehicle travels straight ahead, when the yaw rate is equal to or greater than a set yaw rate value, the vehicle speed is equal to or greater than a set vehicle speed value of 50 KPH, the curvature is equal to or greater than a set curvature value, the viewing area is equal to or greater than a set viewing area value, the camera reliability is 2 or more, the lane type is recognized as a lane, or the lane width variation is equal to or greater than a set lane width variation value.

For example, the yaw rate value may be set as 0.0052 Rad, the vehicle speed may be set as 50 KPH, the curvature may be set as 0.00012 Rad, the viewing area may be set as 30 m, the camera reliability may be set as 2, and the lane type may not be decided or may be set as a road edge or a barrier.

In addition, as illustrated in FIG. 3, the compensation condition determination unit 20 may also determine whether the vehicle travels straight ahead, using a global positioning system (GPS) signal or map information.

The GPS signal includes position information of the vehicle, and may be obtained through a navigation system or the like provided in the vehicle.

In this case, the compensation condition determination unit 20 collects a GPS signal to detect a driving trajectory of the vehicle and matches the detected driving trajectory to the map information, thereby determining whether the vehicle travels straight ahead, through the driving trajectory of the vehicle.

Furthermore, as illustrated in FIG. 4, the compensation condition determination unit 20 may also determine whether the vehicle travels straight ahead, using a steering angle of a steering wheel.

The steering angle of the steering wheel is an angle at which the driver's steering wheel rotates to the left or right, and may be obtained through a motor-driven power steering (MDPS) system, a steering angle sensor, or the like.

In this case, the compensation condition determination unit 20 determines whether the steering angle of the steering wheel is less than or equal to a preset steering angle value, and determines that the vehicle travels straight ahead when the steering angle of the steering wheel is less than or equal to the set steering angle value.

Meanwhile, as illustrated in FIG. 5, the compensation condition determination unit 20 determines whether the lane is a straight lane, using a lane curvature and a heading angle.

The compensation condition determination unit 20 determines that the lane is the straight lane when the curvatures of the left and right lanes and the values derived from the curvatures of the left and right lanes are "0" and the heading angles of the left and right lanes are equal to each other.

The lane may be modeled as $Y=C_3X^3+C_2X^2+C_1X+C_0$. Here, $C_0$ refers to a lateral offset, $C_1$ refers to a heading angle, $C_2$ refers to a curvature, $C_3$ refers to a curvature derivative value, and Y refers to a lane.

That is, the left lane is modeled and the right lane is modeled, in which case the compensation condition determination unit 20 determines that the lane is the straight lane when the lane Y is "0".

When it is determined by the compensation condition determination unit 20 that the lane is the straight lane, the heading angle processing unit 30 compensates for the heading angle of the camera 10 using the lane distance input from the camera 10.

Referring to FIG. 6, the heading angle processing unit 30 includes a heading angle offset processing unit 31 and a heading angle compensating unit 32.

The heading angle offset processing unit 31 detects a heading angle offset using the heading angle of the camera 10 and the lane distance therefrom. The heading angle offset processing unit 31 includes a reference heading angle calculator 311, a difference value detector 312, and a heading angle offset detector 313.

The reference heading angle calculator 311 calculates a reference heading angle from the heading angle of the camera 10 using the lane distance. That is, the reference heading angle calculator 311 receives the lane distance and the heading angle from the camera 10 and calculates the reference heading angle using the lane distance, in order to secure the reliability of the heading angle of the camera 10.

The difference value detector 312 detects difference values between the reference heading angle calculated by the reference heading angle calculator 311 and the heading angle of the camera 10 in chronological order.

The heading angle offset detector 313 detects a heading angle offset by averaging the difference values detected by the difference value detector 312 in chronological order. That is, when the difference values calculated by the difference value detector 312 are input to the heading angle offset detector 313, the heading angle offset detector 313 detects the heading angle offset by averaging the difference values at the heading angle of the camera 10 for each time zone.

The heading angle compensating unit 32 compensates for the heading angle of the camera 10 using the heading angle of the camera 10 and the heading angle offset detected by the heading angle offset detector 313. In this case, the heading angle compensating unit 32 compensates for the heading angle of the camera 10 by subtracting the heading angle offset, detected by the heading angle offset detector 313, from the heading angle of the camera 10.

Hereinafter, a method of compensating for a heading angle according to an embodiment of the present invention will be described in detail with reference to FIG. 7.

Figure 7:
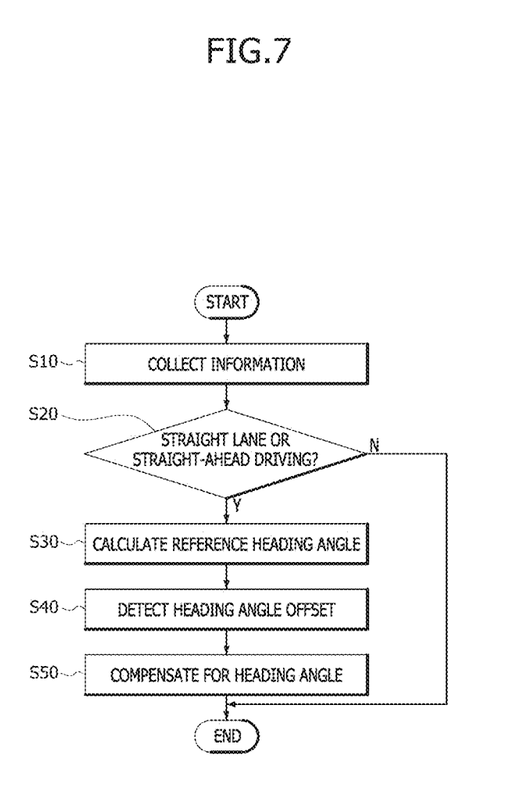
FIG. 7 is a flowchart illustrating a method of compensating for a heading angle according to an embodiment of the present invention.

FIG. 7 is a flowchart illustrating the method of compensating for a heading angle according to the embodiment of the present invention.

Referring to FIG. 7, a compensation condition determination unit 20 collects information for determining a compensation condition to compensate for a heading angle of a camera 10 (S10).

The information for determining the compensation condition may include camera information, a yaw rate, a vehicle speed, a GPS signal, map information, and a steering angle. The camera information may include a heading angle of the camera 10, a lane curvature, a viewing area, a camera reliability, a lane type, and a lane width variation.

As the information for determining the compensation condition is collected, the compensation condition determination unit 20 determines whether a predetermined compensation condition is satisfied, namely, whether the lane is a straight lane or the vehicle travels straight ahead, in order to compensate for the heading angle of the camera 10 (S20).

For example, the compensation condition determination unit 20 determines that the vehicle travels straight ahead, when the yaw rate is equal to or greater than a set yaw rate value, the vehicle speed is equal to or greater than a set vehicle speed value, the curvature is equal to or greater than a set curvature value, the viewing area is equal to or greater than a set viewing area value, the camera reliability is high or medium, the lane type is recognized as a lane, or the lane width variation is equal to or greater than a set lane width variation value.

In addition, the compensation condition determination unit 20 uses a GPS signal to detect a driving trajectory of the vehicle, and matches the detected driving trajectory to map information, thereby determining whether the vehicle travels straight ahead on the map, through the driving trajectory of the vehicle.

Furthermore, the compensation condition determination unit 20 determines whether a steering angle of a steering wheel is less than or equal to a preset steering angle value, and determines that the vehicle travels straight ahead, when the steering angle of the steering wheel is less than or equal to the set steering angle value.

Meanwhile, the compensation condition determination unit 20 may determine whether the lane is a straight lane, using the lane curvature and the heading angle.

In this case, the compensation condition determination unit 20 models each of left and right lanes. The compensation condition determination unit 20 determines that the lane is the straight lane when the curvatures of the left and right lanes and the values derived from the curvatures of the left and right lanes are "0" and the heading angles of the left and right lanes are equal to each other.

As described above, when it is determined by the compensation condition determination unit 20 that the compensation condition is satisfied, a reference heading angle calculator 311 calculates a reference heading angle using the lane distance (S30).

Next, a difference value detector 312 detects difference values between the reference heading angle calculated by the reference heading angle calculator 311 and the heading angle of the camera 10 in chronological order. A heading angle offset detector 313 detects a heading angle offset by averaging the difference values, detected by the difference value detector 312, for each time zone (S40).

As the heading angle offset is detected by the heading angle offset detector 313, a heading angle compensating unit 32 compensates for the heading angle of the camera 10 using the heading angle of the camera 10 and the heading angle offset detected by the heading angle offset detector 313 (S50). In this case, the heading angle of the camera 10 is compensated for by subtracting the heading angle offset, detected by the heading angle offset detector 313, from the heading angle of the camera 10.

As described above, the apparatus and method for compensating for a heading angle according to the exemplary embodiments of the present invention can improve the deviation of the vehicle in the lane keeping assistance system by compensating for the heading angle of the camera through the lane distance to assist the lane keeping of the vehicle.

In addition, the apparatus and method for compensating for a heading angle according to the exemplary embodiments of the present invention can assist the lane keeping of the vehicle without performing camera correction operations such as after service (AS) and AutoFix when the vehicle is leaned by the lane keeping assistance system.

While various embodiments have been described above, it will be understood by those skilled in the art that the embodiments described are by way of example only. It will be apparent to those skilled in the art that various modifications and other equivalent embodiments may be made without departing from the spirit and scope of the disclosure. Accordingly, the true technical protection scope of the invention should be defined by the appended claims.

What is claimed is:

1. An apparatus for compensating for a heading angle, comprising:
   a compensation condition determination unit configured to determine whether a predetermined compensation condition is satisfied, to compensate for a heading angle of a camera; and
   a heading angle processing unit configured to compensate for the heading angle of the camera using a lane distance input from the camera when it is determined by the compensation condition determination unit that the predetermined compensation condition is satisfied,
   wherein the heading angle processing unit comprises a heading angle offset processing unit that is configured to detect a heading angle offset using the heading angle of the camera and the lane distance therefrom, wherein the heading angle offset processing unit comprises:
   a reference heading angle calculator configured to calculate a reference heading angle from the heading angle of the camera using the lane distance;
   a difference value detector configured to detect difference values between the reference heading angle calculated by the reference heading angle calculator and the heading angle of the camera in chronological order; and
   a heading angle offset detector configured to detect the heading angle offset by averaging the difference values, detected by the difference value detector, for each time zone.

2. The apparatus according to claim 1, wherein the compensation condition determination unit is configured to determine whether a vehicle travels straight ahead.

3. The apparatus according to claim 2, wherein the compensation condition determination unit is configured to determine whether the vehicle travels straight ahead, using at least one of a vehicle yaw rate, a vehicle speed, a lane curvature, a camera viewing area, a camera reliability, a lane type, and a lane width variation.

4. The apparatus according to claim 2, wherein the compensation condition determination unit is configured to determine whether the vehicle travels straight ahead, using a steering angle of the vehicle.

5. The apparatus according to claim 2, wherein the compensation condition determination unit is configured to detect a trajectory of the vehicle using a GPS signal and map information and determines whether the vehicle travels straight ahead, using the detected trajectory.

6. The apparatus according to claim 1, wherein the compensation condition determination unit is configured to determine whether a lane is a straight lane.

7. The apparatus according to claim 6, wherein the compensation condition determination unit is configured to determine whether the lane is the straight lane, using a curvature of the lane and a heading angle of the camera.

8. The apparatus according to claim 1, wherein the heading angle processing unit comprises:
   a heading angle compensating unit configured to compensate for the heading angle of the camera by subtracting the heading angle offset, detected by the heading angle offset processing unit, from the heading angle of the camera.

9. An apparatus for compensating for a heading angle, comprising:
   a heading angle offset processing unit configured to detect a heading angle offset using a heading angle of a camera and a lane distance therefrom; and
   a heading angle compensating unit configured to compensate for the heading angle of the camera using the heading angle of the camera and the heading angle offset detected by the heading angle offset processing unit
   wherein the heading angle offset processing unit comprises:
   a reference heading angle calculator configured to calculate a reference heading angle using the lane distance;

a difference value detector configured to detect difference values between the reference heading angle calculated by the reference heading angle calculator and the heading angle of the camera in chronological order; and a heading angle offset detector configured to detect the heading angle offset by averaging the difference values, detected by the difference value detector, for each time zone.

10. The apparatus according to claim 9, wherein the heading angle compensating unit is configured to compensate for the heading angle of the camera by subtracting the heading angle offset, detected by the heading angle offset processing unit, from the heading angle of the camera.

11. A method of compensating for a heading angle, comprising:

determining whether a predetermined compensation condition is satisfied, to compensate for a heading angle of a camera, by a compensation condition determination unit; and compensating for the heading angle of the camera using a lane distance input from the camera, when it is determined by the compensation condition determination unit that the predetermined compensation condition is satisfied, by a heading angle processing unit, wherein in the compensating for the heading angle of the camera, the heading angle processing unit detects a heading angle offset using the heading angle of the camera and the lane distance therefrom and compensates for the heading angle of the camera by subtracting the detected heading angle offset from the heading angle of the camera, wherein in the compensating for the heading angle of the camera, the heading angle processing unit calculates a reference heading angle from the heading angle of the camera using the lane distance, detects difference values between the calculated reference heading angle and the heading angle of the camera in chronological order, and then detects the heading angle offset by averaging the detected difference values for each time zone.

12. The method according to claim 11, wherein in the determining whether a predetermined compensation condition is satisfied, the compensation condition determination unit determines whether a vehicle travels straight ahead.

13. The method according to claim 12, wherein in the determining whether a predetermined compensation condition is satisfied, the compensation condition determination unit determines whether the vehicle travels straight ahead, using at least one of a vehicle yaw rate, a vehicle speed, a lane curvature, a camera viewing area, a camera reliability, a lane type, and a lane width variation.

14. The method according to claim 12, wherein in the determining whether a predetermined compensation condition is satisfied, the compensation condition determination unit determines whether the vehicle travels straight ahead, using a steering angle of the vehicle.

15. The method according to claim 12, wherein in the determining whether a predetermined compensation condition is satisfied, the compensation condition determination unit detects a trajectory of the vehicle using a GPS signal and map information and determines whether the vehicle travels straight ahead, using the detected trajectory.

16. The method according to claim 11, wherein:

in the determining whether a predetermined compensation condition is satisfied, the compensation condition determination unit determines whether a lane is a straight lane; and in the determining whether a predetermined compensation condition is satisfied, the compensation condition determination unit determines whether the lane is the straight lane, using a curvature of the lane and a heading angle of the camera.

* * * * *